United States Patent [19]

Watanabe et al.

[11] Patent Number: 5,026,961
[45] Date of Patent: Jun. 25, 1991

[54] FEED APPARATUS

[75] Inventors: Toshiya Watanabe; Tasuku Kawanabe, both of Nagoya, Japan

[73] Assignee: Brother Kogyo Kabushiki Kaisha, Aichi, Japan

[21] Appl. No.: 410,356

[22] Filed: Sep. 21, 1989

[30] Foreign Application Priority Data

Oct. 5, 1988 [JP] Japan .................... 63-130709[U]

[51] Int. Cl.$^5$ .................... B23Q 5/34; B23H 7/02
[52] U.S. Cl. .................... 219/69.11; 219/69.12
[58] Field of Search .................... 219/69.12, 69.11; 83/716, 717, 723, 727, 548, 613, 631, 651.1; 226/196, 199

[56] References Cited

U.S. PATENT DOCUMENTS

| | | | |
|---|---|---|---|
| 3,731,043 | 5/1973 | Ullmann et al. | 219/69.12 |
| 4,460,816 | 7/1984 | Bonga | 219/69.12 |
| 4,461,942 | 7/1984 | Delpretti | 219/69.12 |
| 4,663,509 | 5/1987 | Kawashima | 219/69.12 |
| 4,733,041 | 3/1988 | Obara | 219/69.12 |

FOREIGN PATENT DOCUMENTS 62-84923 4/1987 Japan .................... 219/69.12

Primary Examiner—Geoffrey S. Evans
Attorney, Agent, or Firm—Oliff & Berridge

[57] ABSTRACT

A feed apparatus includes first guides disposed between a base and a first slide to guide the first slide on the base along a first axis, second guides disposed between the first slide and a second slide to guide the second slide on the first slide along a second axis at a right angle to the first axis, a first adjustment bolt disposed on the base to impart a preliminary pressure to the first guides, and a second adjustment bolt disposed on the second slide to impart a preliminary pressure to the second guides. Upon imposing the preliminary pressure on the first and second guides, bending transformations are caused in the base and the second slide, but no bending transformation occurs in the first slide, thereby both guides can allow both slides to be smoothly moved. The feed apparatus further includes first and second drive units attached to the base and the second slide, respectively, and first and second nuts secured to the first slide and engaged with first and second lead screws connected with both drive units. Both nuts may be positioned closer on the first slide in such a manner that both lead screws do not interfere with each other and also the thickness of the second slide may decrease to the thickness required to attach the second drive unit alone, so that the whole size and weight of the feed apparatus can be made small and light enough to accomplish accurate feed movement.

17 Claims, 5 Drawing Sheets

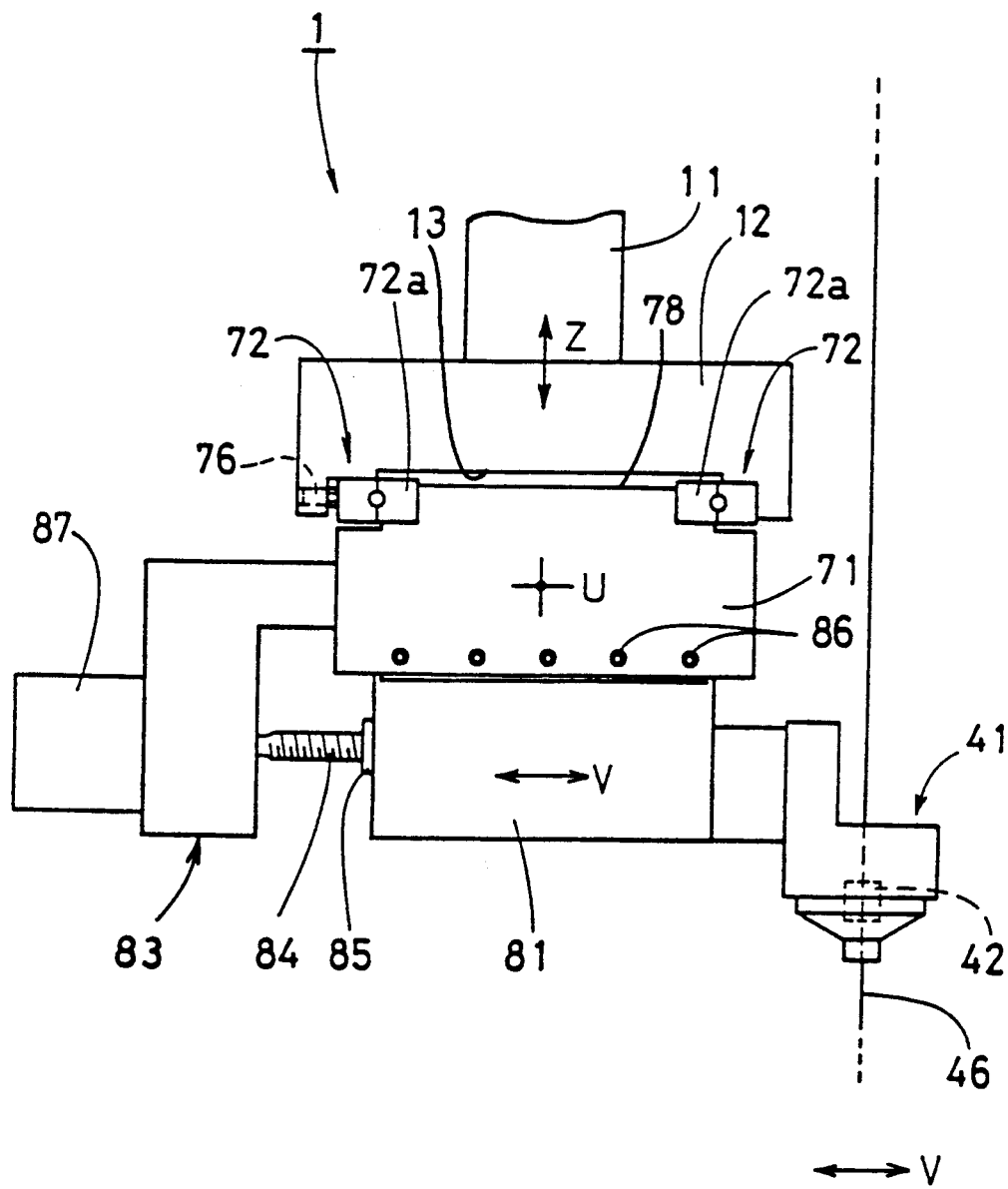

FEED APPARATUS

FIELD OF THE INVENTION

The present invention relates to a feed apparatus for machines such as a machine tool and, in particular, to an improved feed apparatus wherein a first slide and a second slide are equipped so as to be moved along two axes intersecting each other.

BACKGROUND OF THE INVENTION

As an example of a conventional feed apparatus, a feed apparatus utilized for taper-cutting a workpiece in a wire cutting type electric discharge machining system will be explained in reference to FIGS. 4 and 5.

FIG. 4 is a front view of the conventional feed apparatus and FIG. 5 is a left side view of the feed apparatus.

This conventional feed apparatus 1 for taper-cutting a workpiece comprises a base 12 secured to a lower portion of a Z-slide 11, a U-slide 71 supported by a lower portion of the base 12 through a pair of U-guides 72 for straight movement, and a V-slide slide 81 supported by a lower portion of the U-slide 71 through a pair of V-guides 82 for straight movement. The U-slide 71 is constructed so as to be slidably moved along a U-axis shown by an arrow U in FIG. 4. The V-slide 81 is constructed so as to be slidably moved along a V-axis at a right angle with the U-axis and supports a guide holder 41 which an upper wire guide member 42 is disposed inside. Thus, the feed apparatus 1 moves the upper wire guide member 42 relative to a lower wire guide member along the U-axis and the V-axis, so that a wire electrode 46 extended between both guide members is inclined.

A U-drive unit 73 provided with a U-feed motor 77 and a speed reduction mechanism is attached to the base 12 for rotating a U-feed lead screw 74 which is engaged with a U-nut 75 secured to the U-slide 71. A V-drive unit 83 provided with a V-feed motor 87 and a speed reduction mechanism is attached to the U-slide 71 for rotating a V-feed lead screw 84 which is engaged with a V-nut 85 secured to the V-slide 81.

In addition, as shown in FIG. 5, the base 12 is provided with a recess 13 in its lower portion and the U-slide 71 is provided with a projection 78 in its upper portion. The U-guides 72 are disposed between side edges of the recess 13 and the projection 78. An adjustment bolt 76 is disposed on one side edge of the recess 13 for imparting a preliminary pressure to the U-guides 72. Likewise, as shown in FIG. 4, the U-slide 71 is provided with a recess 79 in its lower portion and the V-slide 81 is provided with a projection 88 in its upper portion. The V-guides 82 are disposed between side edges of the recess 79 and the projection 88 and are imparted with a preliminary pressure by an adjustment bolt 86 disposed on one side edge of the recess 79 of U-slide 71.

In the conventional feed apparatus having the foregoing construction, since the V-nut 85 is secured to the V-slide 81 and the U-nut 75 is secured to the U-slide 71, the V-slide 81 and the U-slide 71 each require a thickness larger than an external diameter of the nut secured to each slide. Consequently, the thickness of both slides 71 and 81 increases in the Z-axis and whole size and weight of the feed apparatus are rendered larger, thereby causing inaccurate feed movement.

Further, when the adjustment bolt 86 is tightened to impart a preliminary pressure to the V-guides 82, a bending transformation is caused by the preliminary pressure P as shown with a dot line in FIG. 4 in such a manner that lower end portions of both sides of the U-slide 71 are spread, while in an upper portion of the U-slide 71 both sides are pushed up and its central part is pulled back. Likewise, a bending transformation occurs in internal rails 72a of the U-guides 72 secured to the U-slide 71 as shown in FIG. 5 so that the transformation obstructs the U-guides 72 from smoothly guiding the U-slide 71 along the U-axis and causes inaccurate feed movement.

SUMMARY OF THE INVENTION

Accordingly, it is an object of the present invention to provide a feed apparatus capable of performing accurate feed movement.

It is another object of the present invention to provide a feed apparatus of light weight and small size in a direction of thickness.

It is still another object of the present invention to provide a feed apparatus capable of smoothly guiding both slides regardless of transformations of the base and the slide caused by tightening the adjustment bolt.

In order to accomplish the above-mentioned objects, the feed apparatus according to the present invention is provided with a base, a first slide supported by the base to slide relative to the base along a first axis and a second slide supported by the first slide to slide relative to the first slide along a second axis intersecting the first axis, thereby allowing movement of an object mounted on the second slide in a plane defined by the first and second axes. Further, the feed apparatus comprises a first drive unit attached to the base and including a first feed motor, first transmitting means disposed between the first slide and the first drive unit for transmitting drive force of the first feed motor to the first slide, a second drive unit attached to the second slide and including a second feed motor, and second transmitting means disposed between the first slide and the second drive unit for transmitting drive force of the second feed motor to the first slide, whereby the second slide is moved relative to the first slide.

In addition, the feed apparatus according to the present invention for moving an object in a plane defined by a first axis and a second axis intersecting each other, comprises a base provided with a first recess extending in a direction of the first axis, a first slide provided with two projections on opposite surfaces, one of two projections being formed to be accommodated in the first recess, first guide means disposed between the first recess and the projection accommodated therein for guiding the first slide along the first axis relative to the base, a second slide provided with a second recess extending in a direction of the second axis, the other of two projections being formed to be accommodated in the second recess, second guide means disposed between the second recess and the projection accommodated therein for guiding the second slide along the second axis relative to the first slide, first pressure means disposed on the base for imparting a preliminary pressure to the first guide means, and second pressure means disposed on the second slide for imparting a preliminary pressure to the second guide means.

In the feed apparatus according to the present invention constructed as described above, the first slide placed between the base and the second slide is connected in common with the first and second transmitting means, and the second drive unit is attached to the second slide. Accordingly, it is not necessary for the second slide to secure a space for attaching a connecting means such as a nut but a space for attaching the second drive unit, thereby rendering the second slide small in a direction of thickness. Further, the connecting positions of the first and second transmitting means on the first slide are rendered closer in a direction of thickness in such a manner that the first and second transmitting means do not interfere with each other, so that thickness of the first slide decreases. As a result, the whole size and weight of the feed apparatus can be made small enough to perform accurate feed movement.

In addition, since the first and second pressure means are individually disposed on the base and the second slide, no bending transformation but compression force is caused in the first slide upon imposing a preliminary pressure on the first and second guides. Although the transformations of the base and the second slide are caused, no bending transformation but increased compression force occurs in rails of the first and second guides. Consequently, the first and second guides can allow the first and second slides to be smoothly moved, so that accurate feed movement is accomplished.

Furthermore, since it is not necessary to consider an external force causing the bending transformations in the first and second guides when designing the strength of both guides, it may adopt a small size of guide so as to render a whole size of the feed apparatus small.

BRIEF DESCRIPTION OF THE DRAWINGS

The above and other objects, features and advantages of the present invention will become more apparent from reading the following description of the preferred embodiment taken in connection with the accompanying drawings in which:

FIG. 5 is a left side view of the conventional feed apparatus.

DESCRIPTION OF THE PREFERRED EMBODIMENTS

Figure 1:
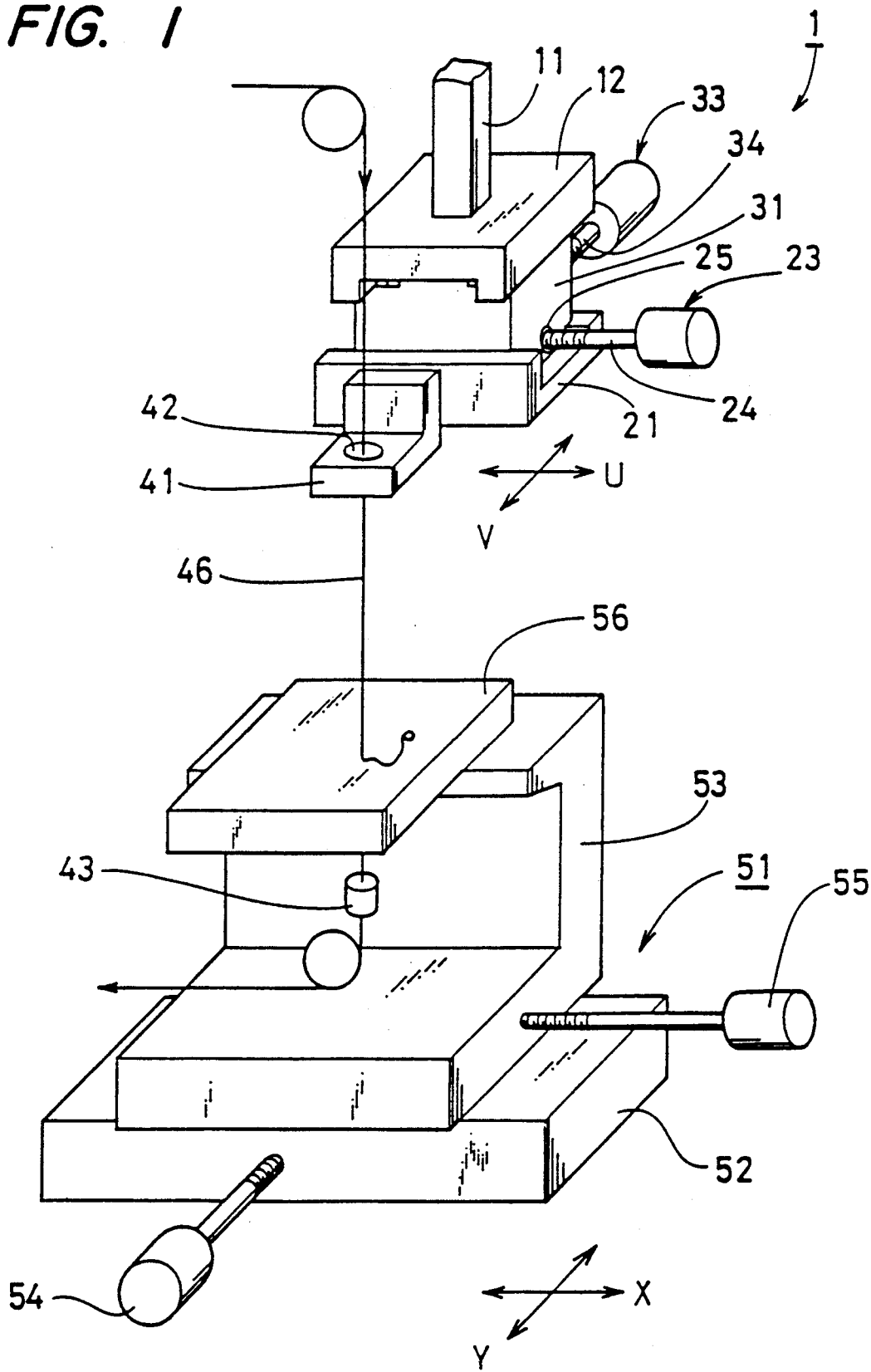
FIG. 1 is a perspective view of an embodiment of a feed apparatus according to the present invention applied to a wire cutting type electric discharge machining system for tapercutting a workpiece.
Figure 2:
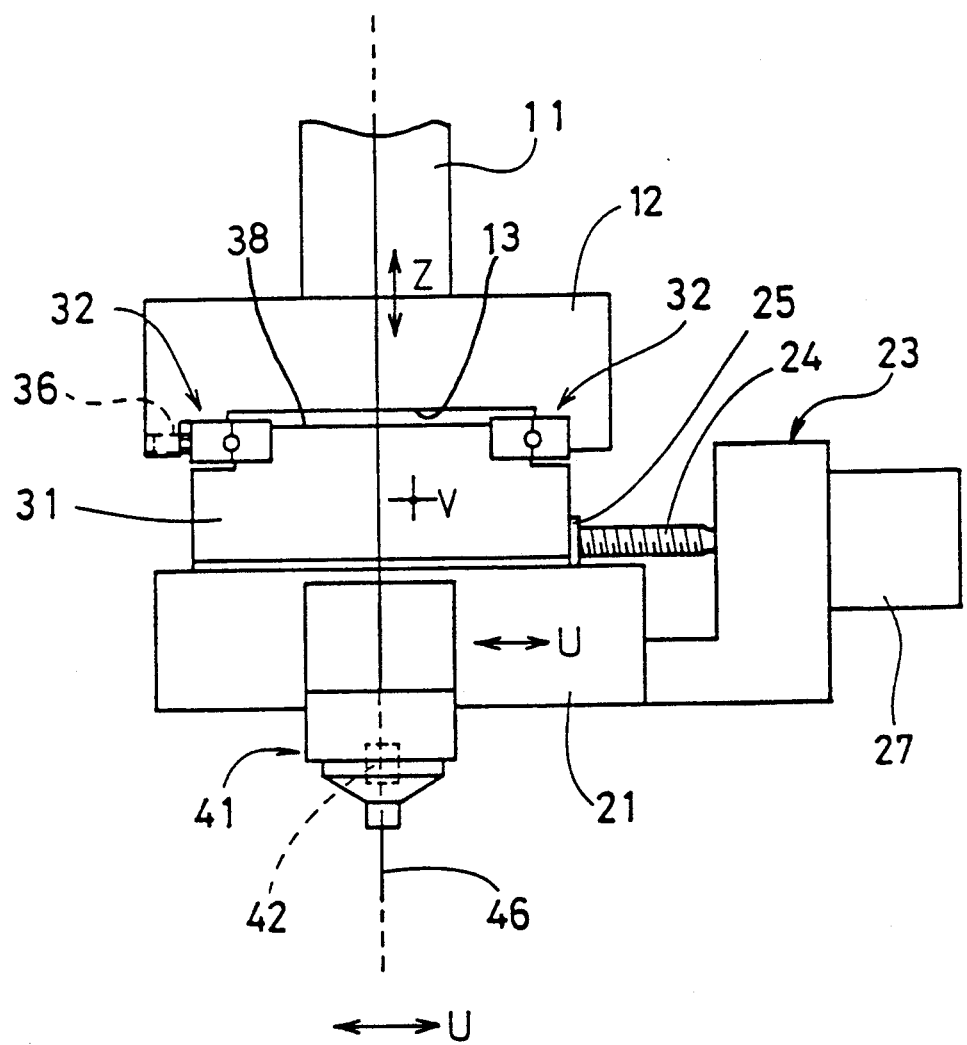
FIG. 2 is a front view of the embodiment.

An embodiment of the feed apparatus according to the present invention applied to a wire cutting type electric discharge machining system will now be explained in reference to FIGS. 1-3.

This electric discharge machining system performs a desired machining in such a way that a workpiece 56 supported by a workpiece table 51 is moved in a horizontal plane defined by the X- and Y-axes of X-, Y- and Z-axes at right angles with one another, relative to a wire electrode 46 extended between an upper wire guide member 42 and a lower wire guide member 43 which are constituted with wear-resistant and nonconductive materials. The workpiece table 51 comprises a Y-table 52 driven by a Y-drive motor 54 and a X-table 53 driven by a X-drive motor 55. The Y-table 52 is supported so as to be slidably moved along the Y-axis relative to a body frame and the X-table 53 is supported so as to be slidably moved along the X-axis relative to the Y-table 52.

A feed apparatus 1 for taper-cutting the workpiece 56 is disposed above the workpiece table 51, and moves a guide holder 41 equipped inside with the upper wire guide member 42 along a U-axis parallel to the X-axis and a V-axis at right angles with the U- and Z-axes, so that the wire electrode 46 is inclined relative to the workpiece 56.

A base 12 is secured to a lower portion of a Z-slide 11 which is supported so as to be moved along the Z-axis relative to a column. As shown in FIG. 3, a V-drive unit 33 is attached to a left side of the base 12 and comprises a V-feed motor 37 and a speed reduction mechanism. A recess 13 is formed in a lower portion of the base 12, as shown in FIG. 2. A projection 38 formed in an upper portion of a V-slide 31 is fitted to the recess 13 of the base 12 through a pair of V-guides 32 for straight movement to slide the V-slide 31 along the V-axis. An adjustment bolt 36 is disposed on the side edge of the recess 13 of the base 12 for imparting a preliminary pressure to the V-guides 32 and is tightened in such a manner that the V-guides 32 are pushed at a required pressure in a direction of the U-axis. A V-nut 35 is secured to the V-slide 31 and is engaged with a V-feed lead screw 34 rotated by the V-drive unit 33. Accordingly, the V-slide 31 is driven by the V-drive unit 33 in a direction of the V-axis relative to the base 12.

Figure 3:
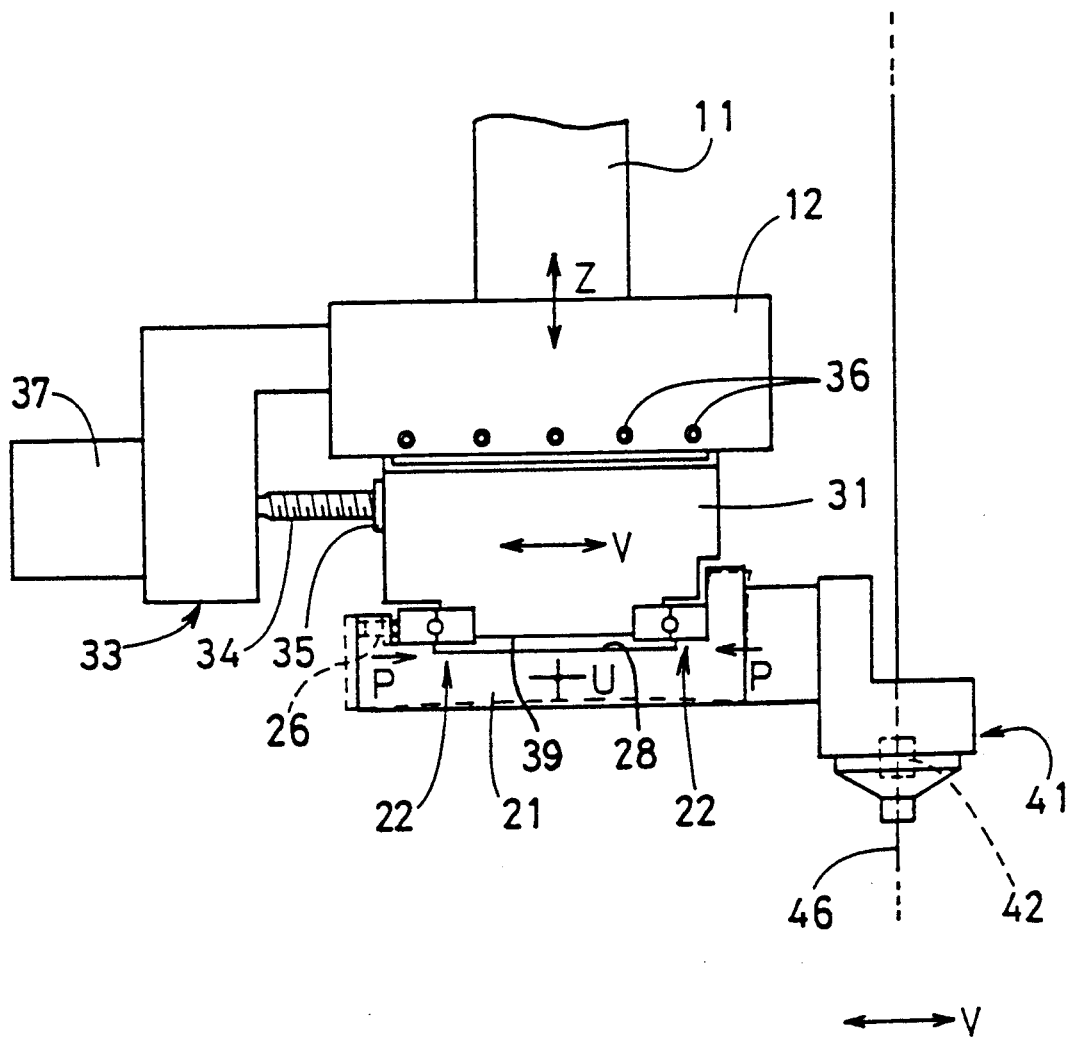
FIG. 3 is a left side view of the embodiment.

A projection 39 is formed in a lower portion of the V-slide 31 as shown in FIG. 3. A recess 28 is formed in an upper portion of a U-slide 21 and is fitted to the projection 39 of the V-slide 31 through a pair of U-guides 22 for straight movement to slide the U-slide 21 in a direction of the U-axis. An adjustment bolt 26 is installed in the side edge of the recess 28 of the U-slide 21 and is tightened so as to impart a required preliminary pressure to the U-guides 22 in a direction of the V-axis. As shown in FIG. 2, a U-drive unit 23 comprising a U-feed motor 27 and a speed reduction mechanism is attached to the right side of the U-slide 21. A U-nut 25 is secured to a right side of the V-slide 31 and is engaged with a U-feed lead screw 24 rotated by the U-drive unit 23. Thus, the U-slide 21 is driven by the U-drive unit 23 relative to the V-slide 31 in a direction of the U-axis.

In the feed apparatus of the wire cutting type electric discharge machining system for taper-cutting workpiece constructed as described above, the V-nut 35 and U-nut 25 are both mounted on the V-slide 31, thus, the thickness of the U-slide 21 in the Z-axis may be reduced to the thickness required to attach the U-drive unit 23 to the U-slide 21 as long as the strength of the U-slide 21 is appropriate. In addition, since the V-nut 35 and the U-nut 25 disposed thereunder on the V-slide 31 may be placed closer in such a manner that the V-feed lead screw 34 and the U-feed lead screw 24 do not interfere with each other, the thickness of the V-slide 31 can be reduced substantially to the thickness of the slide of the conventional feed apparatus. Consequently, the whole thickness of the feed apparatus 1 can be reduced in the direction of the Z-axis.

Figure 4:
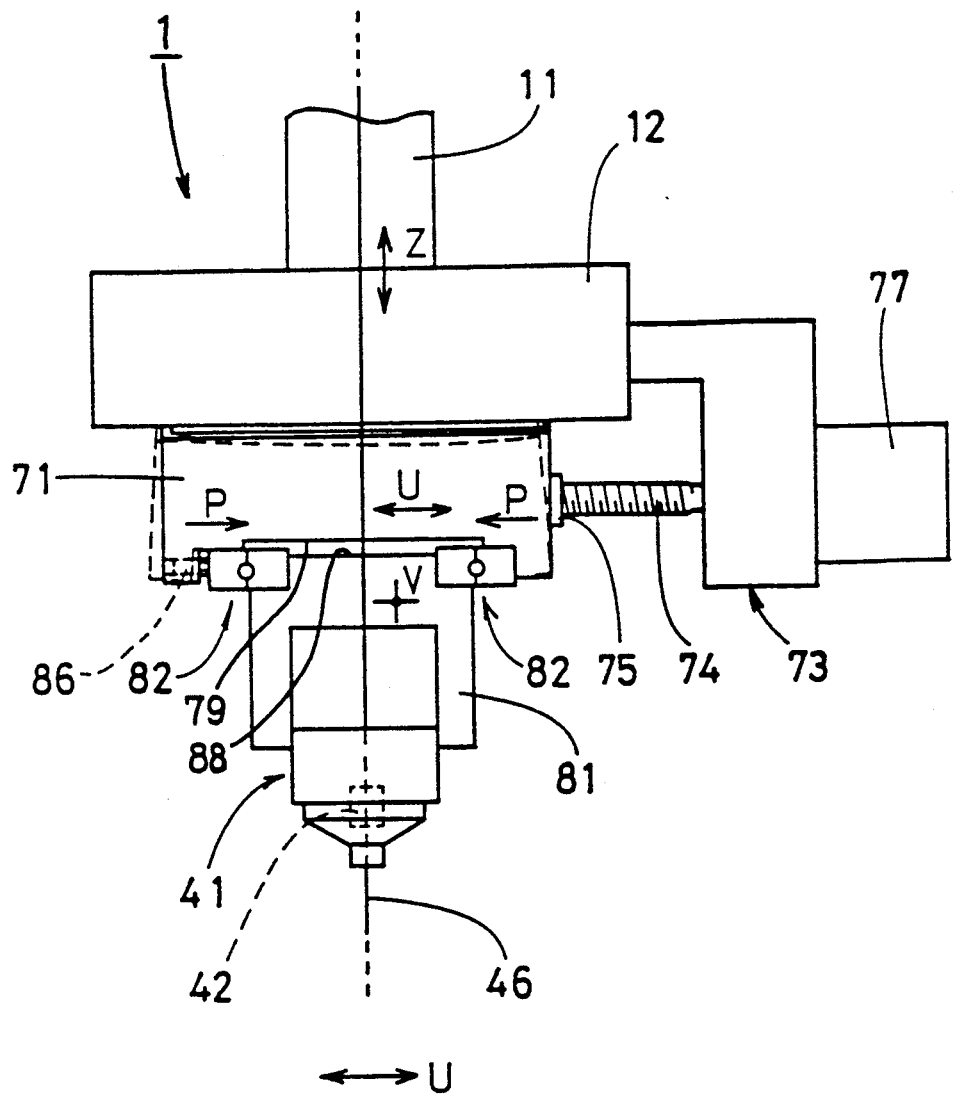
FIG. 4 is a front view of a conventional feed apparatus utilized for a wire cutting type electric discharge machining system.

When the adjustment bolt 26 is tightened so as to impart the preliminary pressure to the U-guides 22 in a direction of the V-axis, the bending transformation is caused by the preliminary pressure P as shown with a dot line in FIG. 3 in such a manner that the upper end portions of both sides of the U-slide 21 are spread, while the lower portion of the U-slide 21 is pulled back in both sides and is pushed up in its central part. In this state, compression force is imposed on the U-guides 22 and the V-slide 31. However the bending transformation does not occur in the V-slide 31 since, unlike the feed apparatus shown in FIGS. 4 and 5, it is the U-slide 21 rather than the V-slide 31 which has the recess 28. Accordingly, the U-guides 22 and the V-guides 32 can allow the U-slide 21 and the V-slide 31 to be smoothly moved along the U- and V-axes.

The present invention may be applied not only to a feed apparatus for taper-cutting a workpiece in a wire cutting type electric discharge machining system like the foregoing embodiment, but also to a general type of a feed apparatus wherein first and second slides such as X-Y tables of a machining tool or a measuring device are moved along two axes intersecting each other, respectively. Thus, the present invention can be widely realized in feed apparatus wherein it is desireable to reduce the thickness thereof.

It should be understood that the present invention is not limited to the above description, but is subject to modifications, alterations and equivalent arrangements within the scope of the appended claims. Thus, while only certain embodiments of the invention have been specifically described herein, it will be apparent from the above teachings that numerous modifications may be made thereto without departing from the spirit and scope of the invention.

WHAT IS CLAIMED IS:

1. A feed apparatus having a base, a first slide supported by the base to slide relative to the base along a first axis and a second slide supported by the first slide to slide relative to the first slide along a second axis intersecting the first axis, wherein an object mounted on the second slide is moved in a plane defined by the first and second axes, said feed apparatus comprising:
   a first drive unit attached to said base and including a first feed motor;
   first transmitting means disposed between said first slide and said first drive unit for transmitting drive force of said first feed motor to said first slide;
   a second drive unit attached to said second slide and including a second feed motor; and
   second transmitting means disposed between said first slide and said second drive unit for transmitting drive force of said second feed motor to said first slide, whereby said second slide is moved relative to said first slide.

2. A feed apparatus according to claim 1, wherein said first transmitting means includes a first lead screw operatively connected with said first drive unit and a first nut secured to said first slide and engaged with said first lead screw, and said second transmitting means includes a second lead screw operatively connected with said second drive unit and a second nut secured to said first slide and engaged with said second lead screw.

3. A feed apparatus for moving an object in a plane defined by a first axis and a second axis intersecting each other, comprising:
   a base provided with a first recess extending in a direction of said first axis;
   a first slide provided with two projections on opposite surfaces, one of said two projections being formed to be accommodated in said first recess;
   first guide means disposed between said first recess and said projection accommodated therein for guiding said first slide along said first axis relative to said base;
   a second slide provided with a second recess extending in a direction of said second axis, the other of said two projections being formed to be accommodated in said second recess;
   second guide means disposed between said second recess and said projection accommodated therein for guiding said second slide along said second axis relative to said first slide;
   first pressure means disposed on said base for imparting a preliminary pressure to said first guide means; and
   second pressure means disposed on said second slide for imparting a preliminary pressure to said second guide means.

4. A feed apparatus according to claim 3, wherein said first pressure means is disposed on a side edge of said first recess and said second pressure means is disposed on a side edge of said second recess.

5. A feed apparatus according to claim 3, wherein each of said first and second pressure means comprises an adjustment bolt.

6. A feed apparatus according to claim 3, wherein said base supports a first drive unit for driving said first slide relative to said base and said second slide supports a second drive unit for driving said second slide relative to said first slide.

7. A feed apparatus for moving an object in a plane defined by a first axis and a second axis at a right angle with respect to each other, comprising:
   a base provided with a first recess extending in a direction of said first axis;
   a first slide provided with two projections on opposite surfaces, one of said two projections being formed to be accommodated in said first recess;
   a pair of first guides for guiding said first slide along said first axis relative to said base, each of said first guides being disposed between each of both side edges of said first recess and said projection accommodated in said first recess;
   a second slide provided with a second recess extending in a direction of said second axis, the other of said two projections being formed to be accommodated in said second recess;
   a pair of second guides for guiding said second slide along said second axis relative to said first slide, each of said second guides being disposed between each of both side edges of said second recess and said projection accommodated in said second recess;
   a first adjustment bolt disposed on one of both side edges of said first recess for imparting to said first guides a preliminary pressure in a direction of said second axis; and
   a second adjustment bolt disposed on one of both side edges of said second recess for imparting to said second guides a preliminary pressure in a direction of said first axis;
   whereby said first and second guides allow said first and second slides to be moved smoothly along said first and second axes, respectively, regardless of transformations of said base and said second slide caused by tightening said first and second adjustment bolts.

8. A feed apparatus for moving an object in a plane defined by a first axis and a second axis intersecting each other, comprising:
   a base provided with a first recess extending in a direction of said first axis;

a first slide provided with two projections on opposite surfaces, one of said two projections being formed to be accommodated in said first recess;

first guide means disposed between said first recess and said projection accommodated therein for guiding said first slide along said first axis relative to said base;

a first drive unit attached to said base and including a first feed motor;

first transmitting means disposed between said first slide and said first drive unit for transmitting drive force of said first feed motor to said first slide;

a second slide provided with a second recess extending in a direction of said second axis, the other of said two projections being formed to be accommodated in said second recess;

second guide means disposed between said second recess and said projection accommodated therein for guiding said second slide along said second axis relative to said first slide;

a second drive unit attached to said second slide and including a second feed motor;

second transmitting means disposed between said first slide and said second drive unit for transmitting drive force of said second feed motor to said first slide, whereby said second slide is moved relative to said first slide;

a first adjustment bolt disposed on said base for imparting a preliminary pressure to said first guide means; and a second adjustment bolt disposed on said second slide for imparting a preliminary pressure to said second guide means.

9. A feed apparatus according to claim 8, wherein said first transmitting means includes a first lead screw operatively connected with said first drive unit and a first nut secured to said first slide and engaged with said first lead screw, and said second transmitting means includes a second lead screw operatively connected with said second drive unit and a second nut secured to said first slide and engaged with said second lead screw.

10. A feed apparatus according to claim 8, wherein said based is moved along a third axis perpendicular to a plane defined by said first and second axes.

11. A feed apparatus according to claim 8, wherein said first adjustment bolt is tightened to impart to said first guide means a preliminary pressure in a direction of said second axis and said second adjustment bolt is tightened to impart to said second guide means a preliminary pressure in a direction of said first axis.

12. In a wire cutting type electric discharge machining system having a wire electrode, a pair of wire guide members for guiding the wire electrode, a workpiece table adapted to support a workpiece and movable in a predetermined plane intersecting the wire electrode extending between both said wire guide members, a feed apparatus for moving at least one of both said wire guide members relative to the workpiece table in a plane substantially parallel to the predetermined plane, said feed apparatus comprising:

a first slide supported by a base to slide relative to the base along a first axis;

a second slide supported by said first slide to slide relative to said first slide along a second axis intersecting said first axis;

a first drive unit attached to said base and including a first feed motor;

first transmitting means disposed between said first slide and said first drive unit for transmitting drive force of said first feed motor to said first slide;

a second drive unit attached to said second slide and including a second feed motor; and second transmitting means disposed between said first slide and said second drive unit for transmitting drive force of said second feed motor to said first slide, whereby said second slide is moved relative to said first slide.

13. A feed apparatus according to claim 12, wherein said first transmitting means includes a first lead screw operatively connected with said first drive unit and a first nut secured to said first slide and engaged with said first lead screw, and said second transmitting means includes a second lead screw operatively connected with said second drive unit and a second nut secured to said first slide and engaged with said second lead screw.

14. In a wire cutting type electric discharge machining system having a wire electrode, a pair of wire guide members for guiding the wire electrode, a workpiece table adapted to support a workpiece and movable in a predetermined plane intersecting the wire electrode extending between both said wire guide members, a feed apparatus for moving at least one of both said wire guide members relative to the workpiece table in a plane defined by a first axis and a second axis intersecting each other and substantially parallel to the predetermined plane, said feed apparatus comprising:

a base provided with a first recess extending in a direction of said first axis;

a first slide provided with two projections on opposite surfaces, one of said two projections being formed to be accommodated in said first recess;

first guide means disposed between said first recess and said projection accommodated therein for guiding said first slide along said first axis relative to said base;

a second slide provided with a second recess extending in a direction of said second axis, the other of said two projections being formed to be accommodated in said second recess;

second guide means disposed between said second recess and said projection accommodated therein for guiding said second slide along said second axis relative to said first slide;

first pressure means disposed on said base for imparting a preliminary pressure to said first guide means; and second pressure means disposed on said second slide for imparting a preliminary pressure to said second guide means.

15. A feed apparatus according to claim 14, wherein said first pressure means is disposed on a side edge of said first recess and said second pressure means is disposed on a side edge of said second recess.

16. A feed apparatus according to claim 14, wherein each of said first and second pressure means comprises an adjustment bolt.

17. A feed apparatus according to claim 14, wherein said base supports a first drive unit for driving said first slide relative to said base and said second slide supports a second drive unit for driving said second slide relative to said first slide.

* * * * *